Sept. 18, 1956
E. C. HANSON
2,763,446
APPARATUS FOR CONVEYING ARTICLES
Filed Feb. 1, 1952
4 Sheets-Sheet 1
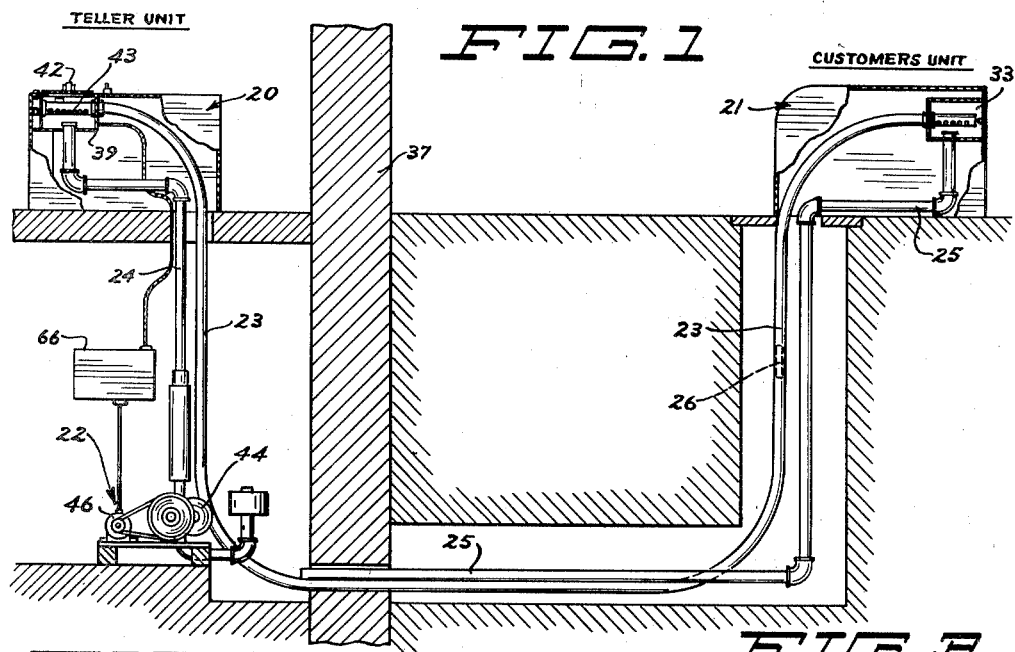
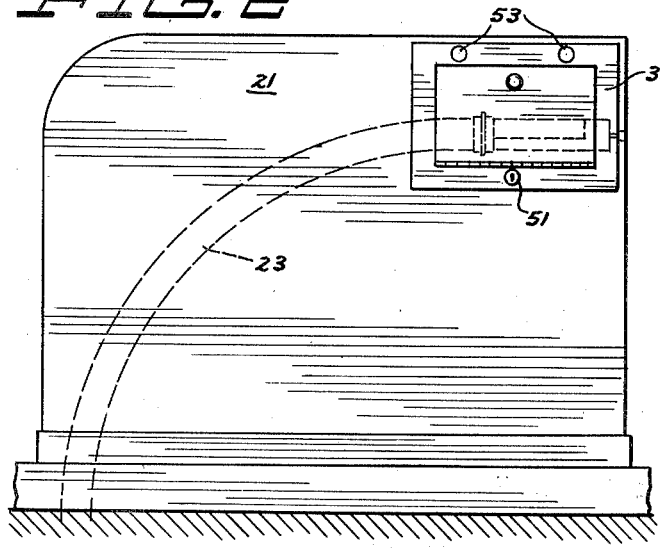
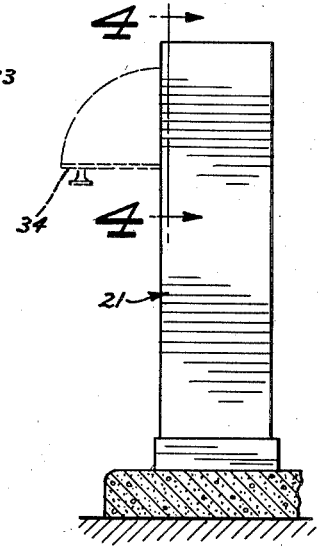
INVENTOR.
EDWARD C. HANSON
BY
Braddock and Braddock
ATTORNEYS Sept. 18, 1956  E. C. HANSON  2,763,446
APPARATUS FOR CONVEYING ARTICLES
Filed Feb. 1, 1952  4 Sheets-Sheet 2
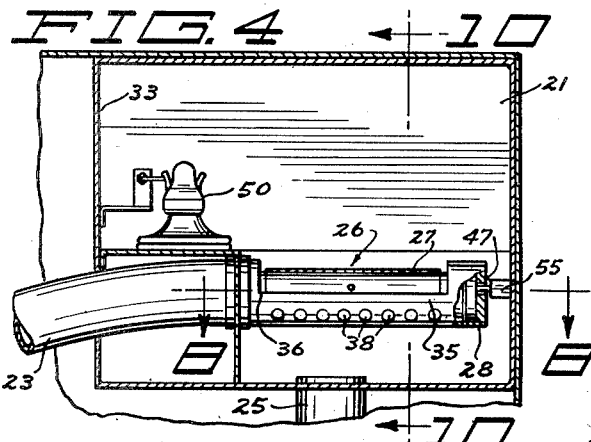
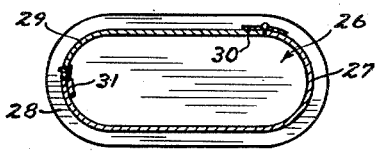
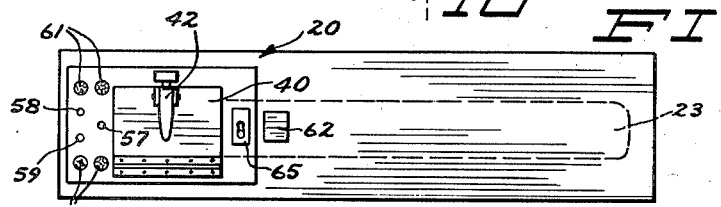
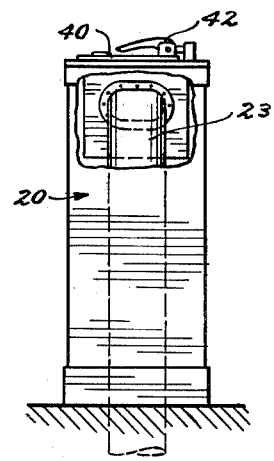
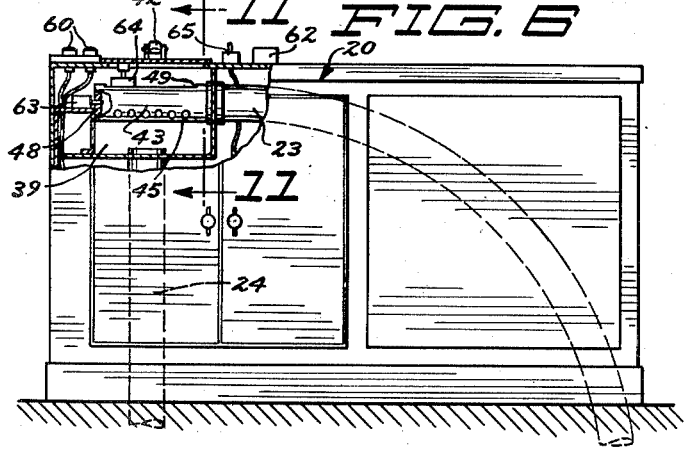
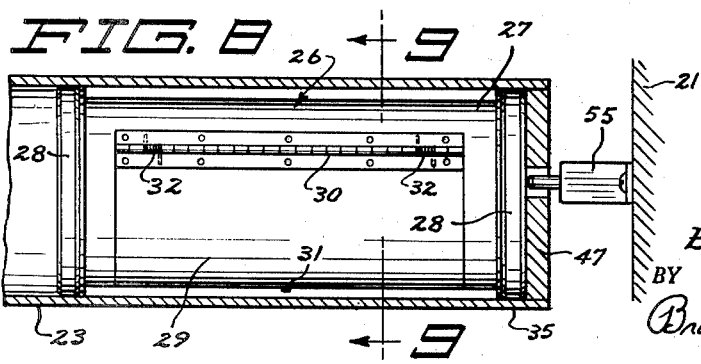
INVENTOR.
EDWARD C. HANSON
BY
Braddock and Braddock
ATTORNEYS

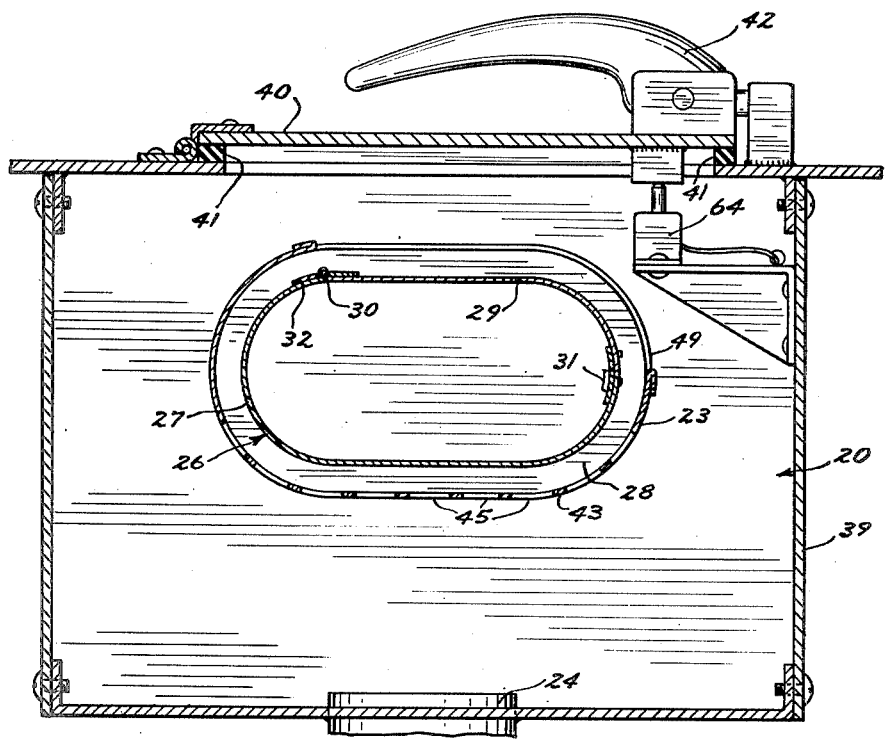
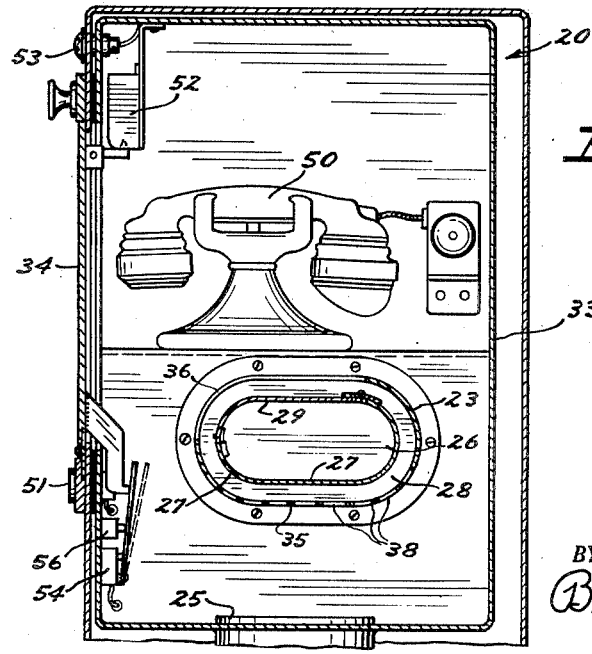

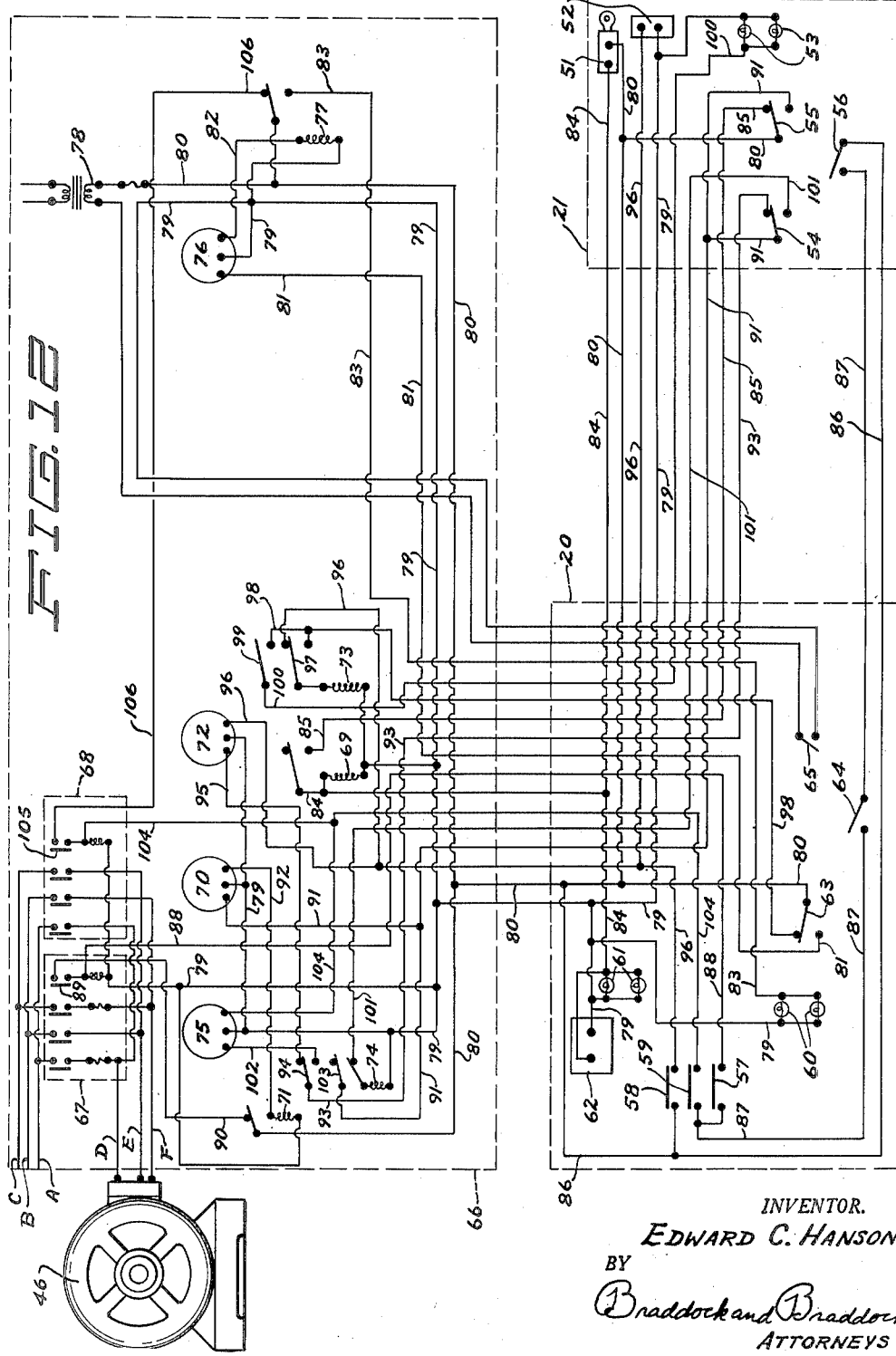

Header omitted 2,763,446

APPARATUS FOR CONVEYING ARTICLES

Edward C. Hanson, Minneapolis, Minn., assignor to Protection Equipment Co., Inc., Minneapolis, Minn., a corporation of Minnesota Application February 1, 1952, Serial No. 269,559

5 Claims. (Cl. 243—7)

This invention has relation to apparatus for conveying articles between two stations remote from each other.

It is an object of the invention to provide apparatus for conveying articles between a customer's unit located outside a bank and a teller's unit located inside the bank. To be effective such apparatus must be capable of operation to provide absolute safety for the customer's funds and his person and for the bank's funds and the person of the teller. The apparatus must be capable of rapid and very simple operation. Apparatus made according to the present invention embodies all of these features.

The invention employs a pneumatic tube and a single carrier which remains inside the tube. A reversible blower causes the carrier to be transported between a teller's unit inside the bank and a customer's unit outside the bank. Electric components control access to the customer's unit, regulate the sequence of operations, and prevent movement of parts when users have access to the interior of the apparatus.

With reference to the drawings which accompany this specification and form a part thereof;

Fig. 1 is a side elevational view of the units making up the apparatus showing their relationship to each other and to the outer wall of a bank building, parts being in section and parts broken away;

Fig. 2 is a side elevational view of a customer's unit;

Fig. 3 is an end view of the unit shown in Fig. 2;

Fig. 4 is an enlarged sectional view taken on line 4—4 in Fig. 3;

Fig. 5 is a top plan view of a teller's unit;

Fig. 6 is a side elevational view of the teller's unit with parts in section and parts broken away;

Fig. 7 is an end view of the unit of Fig. 5 with parts broken away;

Fig. 8 is a sectional view taken on the line 8—8 in Fig. 4;

Fig. 9 is a sectional view taken on the line 9—9 in Fig. 8 of a carrier for conveying articles back and forth between the customer's unit and the teller's unit;

Fig. 10 is an enlarged sectional view taken on the line 10—10 in Fig. 4;

Fig. 11 is an enlarged sectional view taken on the line 11—11 in Fig. 6; and

Fig. 12 is a schematic drawing of the electrical components of the apparatus.

The apparatus for conveying articles consists of a teller's unit 20 located inside of a bank, a customer's unit 21 located outside of a bank at a position accessible to automobiles, a power unit 22 located inside of the bank, a conveyor tube 23 extending between the teller's unit and the customer's unit, a power tube 24 extending from the power unit to the teller's unit, a breather tube 25 extending from the customer's unit to location adjacent the power unit, and an electric control box 66.

The conveyor tube 23 is oval in cross section as best seen in Figs. 10 and 11. An article carrier 26 is situated in the conveyor tube as best seen in Fig. 8. The carrier 26 consists of a hollow metallic body 27 which is oval in cross section and a pair of oval shaped felt heads 28—28 supported on the body 27 at either end thereof. The felt heads 28—28 are of dimension to form an air seal between their outer edges and the sides of the conveyor tube 23. A portion of the body 27 is constituted as a carrier cover 29 which is hingedly connected to the hollow body at 30 and which is held in its closed position by fastener 31. The spring 32 tends to move the carrier cover 29 to its open position when the fastener 31 is released. Since the felt heads are oval in shape, the carrier will always remain in an upright position with respect to the conveyor tube.

The customer's unit 31 may be located at any convenient place outside of a bank, as for example, on the side walk facing the street. This unit 31 includes a generally rectangular case 33 which is closed by a hinged door 34. An end portion 35 of the conveyor tube 23 inside the case 33 is cut away as at 36 to provide access to the article carrier 26 and the carrier cover 29. One end of the breather pipe 25 extends into the rectangular case 33 and the other end thereof extends through an outer wall 37 of a bank building and to a position adjacent the power unit 22. A series of holes 38 in a bottom portion of the end 35 of the conveyor tube 23 are for permitting free passage of air between the conveyor tube and the breather tube.

The teller's unit 20 may be situated at any location on any convenient floor of a bank and includes a generally rectangular case 39. The case 39 is of air tight construction and is closed by the hinged door 40 which carries an air sealing gasket 41 to prevent passage of air between said door and case 39 and is held in closed position by a handle 42. An end 43 of the conveyor tube 23 extends into the rectangular case 39. One end of the power tube 24 opens into the rectangular case 39 of the teller's unit while the other end of the power tube is connected to a blower 44 of the power unit. A series of holes 45 in a bottom side of the end 43 of the conveyor tube are for the purpose of allowing free passage of air between the power tube and the conveyor tube. The end 43 is cut away as indicated at 49 to provide access to the article carrier 26 and cover 29.

The article carrier moves back and forth inside of the conveyor tube to convey articles to and from the teller's and the customer's units. The blower 44 is operably connected to a reversible electric motor 46 of the power unit. When it is desired to move the article carrier 26 from the teller's unit to the customer's unit, an electrical control circuit is operated to cause the electric motor 46 to rotate the blower 44 in such manner as to cause air under pressure to be forced through the power tube 24 in direction toward the teller's unit. This air under pressure causes the article carrier 26 to be moved along the conveyor tube 23 until it reaches the end 35 and strikes an end plate 47 therein. Since the felt heads 28—28 form an air seal with the sides of the conveyor tube 23, air is pushed ahead of the article carrier as it moves from the teller's unit to the customer's unit. This air passes through the holes 38 in the end 35 of the conveyor tube, into and through the breather tube 25 and back to position adjacent the blower 44.

When it is desired to cause the article carrier 26 to move from the customer's unit to the teller's unit, the power to the electric motor 46 is reversed, causing the blower 44 to pump air out of the power tube 24. This reduction in the air pressure in the power tube, by reason of the holes 45 in the end 43 of the conveyor tube, causes a reduction in pressure inside the conveyor tube and so will cause the article carrier to be drawn along that tube until it reaches the end 43 thereof located at the teller's unit where it strikes against an end plate 48 therein and comes to rest. During this movement of the article carrier from the customer's unit to the teller's unit, air passes from adjacent the blower 44, along the breather tube 25 and through the holes 38 and into the conveyor tube.

The end plates 47 and 48, the holes 38 and 45 and the cut away portions of the conveyor tube ends 35 and 43 which are indicated at 36 and 49 are so positioned that when one of the felt heads 28—28 comes in contact with one of the end plates, the other felt head is still within the continuous portion of the conveyor tube and an air seal is still formed between that head and the sides of the conveyor tube. The article carrier is, therefore, held captive in the conveyor tube and will always be urged through the tube in the desired direction when the carrier cover 29 and the hinged door 40 are closed and the reversible motor 46 is in operation.

The specific form of the invention as disclosed in the drawings and as herein described to be considered as merely illustrative of the invention. Numerous changes in the form of the apparatus could be made which would come within the spirit and scope of the invention and claims which follow. For example, the device will operate effectively as long as the interior of the rectangular case 33 and the blower 44 are both open to the atmosphere. Also, while the conveyor tube 23, the article carrier 26 and the felt heads 28—28 are shown and described as being oval in cross-section; it is obvious that any one of a number of other shapes would work equally well.

A telephone 50 is located within the rectangular case 33 within the customer's unit and is used to provide communication between the customer and the teller. A telephone for the teller may be located at any convenient position outside the teller's unit and is not shown in the drawings.

The following components of the control circuit of the apparatus are located in or on the customer's unit. A key switch 51 is located on an outer face of the rectangular case 33 and is manually operable with keys provided to customers of the bank. An electric door lock 52 is mounted inside of the case 33 and normally maintains the door 34 in locked condition. "Door released" jewel lights 53—53 are mounted in the front surface of the case 33. A customer's unit carrier limit switch 55 is mounted on the case 33 and has an operating pin extending through the end plate 47 in position to be operated on by one of the felt heads 28. A customer's unit interlock switch 56 and a door switch 54 are mounted on the case 33 in manner to be operated to be open when the door 34 is open and to be closed when the door 34 is closed.

The following electric components of the apparatus are located in or on the teller's unit. "Carrier out" push button 57 is located on a top surface of the rectangular case 39. Also located on this top surface is an "emergency open" push button 58 and an "emergency in" push button 59. Also on this surface are two sets of jewel lights. A first set, designated 60—60 are "carrier in" lights and indicate, when lighted, that the carrier is at the teller's unit, and a second set of lights denoted 61—61 are known as the key switch lights and indicate, when lighted, that a customer has operated a key in key switch 51. A buzzer 62 is mounted at the teller's unit. A teller unit carrier limit switch 63 is supported on the case 39 and has an operating pin extending through end plate 48 to be in position to be contacted by one of the felt heads 28 of the article carrier 26. The teller's unit interlock switch 64 is operated by the door 40 and is mounted on a bracket inside of the case 39. A master control switch 65 is mounted on the upper surface of the case 39 to be easily accessible to the teller.

An electric control box 66 is mounted at any convenient location and contains the following electrical components of the apparatus. A "carrier out" motor starter relay 67 is for the purpose of causing the motor to drive the blower in direction to force the article carrier from the teller's unit to the customer's unit and a "carrier in" motor starter relay 68 is for causing the motor to operate to cause the carrier to move from the customer's unit to the teller's unit. A key switch holding relay is denoted 69. A "carrier out" timer is denoted 70 while a "carrier out" motor disabling relay is denoted 71. The numeral 72 denotes a "door lock release" timer while a "door lock release" relay is indicated by the numeral 73. "Door lock release" disabling relay 74, "carrier in delay" timer 75, and "carrier in arrival" timer 76 are also located in the electric control box. The "carrier in" motor disabling relay 77 completes the list of electrical components which are located in the electric control box 66.

"Door lock release" relay 73 is of construction which permits new contacts to be established before old contacts are broken. The timers are of construction to be started in operation when power is supplied to the left and center terminals as seen in Fig. 12 and to cause the left and right terminals as seen in Fig. 12 to be electrically connected at the completion of the time period for which they are adjusted. Both the relay 73 and all timers are of usual construction and can be obtained commercially.

In order to prepare the apparatus for operation, the teller manually places the master control switch 65 in the "on" position. This provides a path from the secondary or output terminals of a control circuit transformer 78 to wires 79 and 80. This transformer 78 receives its power from a power source which is not shown. The wire 80 connects one side of the secondary of the control circuit transformer directly to the teller's unit carrier limit switch 63. When the article carrier is in position in the teller's unit, this limit switch will be in position to have the wire 80 connected to wire 81 which is connected to the starting mechanism of the "carrier in arrival" timer 76. When the master control switch 65 is thrown to its "on" position, power passes into this timer 76. Wire 79 is connected to the center terminal of the timer. This connection causes the timer to operate and after the passage of the time period for which it is set, the wire 81 is connected through the inside of the timer to the wire 82 which is connected to one end of the coil of the "carrier in" motor disabling relay 77. This hooks the "carrier in" motor disabling relay 77 across the secondary of the control transformer and causes the contacter of this relay 77 to connect wire 80 which is attached thereto with wire 83. Wire 83 extends to the "carrier in" lights 60—60. Opposite sides of the "carrier in" lights 60—60 are directly connected to the wire 79 and this effectively connects the lights across the secondary of the control circuit transformer and causes them to become lighted. This is the condition of the apparatus when a teller is on duty and the customer's unit is not in use.

When a customer desires to transact business through the customer's unit located outside of the bank, he inserts his key in key switch 51 and turns it. One terminal of the key switch is connected to the wire 80 and turning the switch by means of the key effectively connects the wire 80 to wire 84 which is connected to the other terminal of the key switch. Wire 84 extends to one side of each of the key switch lights 61—61 and the buzzer 62. The other sides of the buzzer and key switch lights are connected to the wire 79 so that turning of the key switch effectively connects the buzzer and the key switch lights at the teller's unit across the secondary of the control circuit transformer 78 and causes them to be operative. Wire 84 also extends to one side of coil and contacter of the key switch holding relay 69. Since the other side of the coil of this relay is connected to the wire 79, and since the other side of the contacter of the relay 69 is connected to a wire 85 which extends through the contacts of the customer's unit carrier limit switch 55 to the wire 80, this relay 69 is effectively "locked in" and the key switch lights and buzzer continue to be operative at the teller's unit to indicate that a customer has turned the key switch.

When the teller is ready to do business with the customer, he presses the "carrier out" push button 57. If both the customer's unit door 34 and the teller's unit door 40 are closed, the customer's unit interlock switch 56 and the teller's unit interlock switch 64 are likewise in closed condition. The wire 80 from the secondary of the control circuit transformer 78 extends to one terminal of the customer's unit interlock switch 56. Since this switch is closed, this effectively connects the wire 80 with the wire 86 which extends from said switch 56 to the teller's unit interlock switch 64. Since this switch is closed, this connects wire 86 with a wire 87 which extends from said switch 64 to one terminal of the "carrier out" push button 57. In pushing this button, the teller connects the wire 87 with a wire 88 which is connected to one terminal of the coil of the "carrier out" motor starter relay 67. Since the other terminal of that coil is connected to wire 79, the coil is effectively across the secondary of the circuit control transformer and the relay will be operative to connect wires A, B and C from a source of three phase power (not shown) to motor power leads D, E and F respectively. Contacter 89 in the relay 67 connects wire 87 with a wire 90 which is connected through the contacts of the "carrier out" motor disabling relay 71 to the wire 80 thus "locking in" the coil of the relay 67 as long as the coil of the relay 71 is not energized. This causes the motor to rotate in direction to cause the blower to deliver air under pressure to the power tube 24 and the end 43 of the conveyer tube 23 to drive the article carrier 26 through the conveyer tube 23 toward the customer's unit 21.

Upon arrival at the customer's unit, the article carrier will operate the customer's unit carrier limit switch 55 to cause the connection between the wire 80 and the wire 85 to be broken and to cause the wire 80 to be connected to a wire 91. Wire 91 is connected to the left hand terminal of the "carrier out" timer 70 and the center terminal of the timer 70 is connected to the wire 79. This connection starts the timer in operation and after a time delay of unit length takes place, the two outside terminals are effectively connected together inside of the timer 70 and the wire 91 is electrically connected to a wire 92 which extends from the right hand terminal of the timer to one side of the coil of the "carrier out" motor disabling relay 71. The other side of the coil of relay 71 is connected to wire 79 and this causes the coil to be effectively connected across the secondary terminals of the control circuit transformer 78 and the coil is then operative to break contact between the wire 80 and the wire 90. This breaks the circuit to the coil of the "carrier out" motor starter relay 67 and the motor is disconnected from the circuit to halt the action of the blower fan. The wire 91 extends also to the center terminal of the door limit switch 54 and makes a contact through that switch as long as the door remains closed to a wire 93. Wire 93 extends to a contacter 94 of the "door lock release" disabling relay 74 which, when relay 74 is not energized, connects to a wire 95 which extends to the left hand terminal of the "door lock release" timer 72. The center terminal of this timer 72 is connected to the wire 79 so that the timing period measured by timer 72 commences at the same time that the carrier limit switch 55 starts the "carrier out" timer 70 in operation. Timer 72 is set to operate for a period of time longer than the unit time of the timer 70. For that reason, at some time after the motor is disconnected from the line, the outside terminals of the timer 72 are shorted together inside of the timer and the wire 95 is connected with a wire 96 which extends from the right hand terminal of the timer to a contacter 97 of the "door lock release" relay 73. The other end of this contacter 97 is connected to one end of the coil of "door lock release" relay 73 and since the other end of the coil of relay 73 is connected to the wire 79, the coil is energized and the contacter 97 breaks contact with the wire 96 and makes contact with a wire 98 which is connected to the wire 80 through the teller's unit carrier limit switch 63. This serves to lock the coil of the relay 73 into the circuit until this limit switch 63 is operated by the return of the carrier to the teller's unit. At the time the relay 73 is operated, a second contacter 99 in that relay connects the wire 88 with the wire 100 which is connected to one side of the "door released" jewel lights 53—53. The other sides of these lights are connected to wire 79 so that these lights are effectively connected across the secondary of the transformer 78 and are therefore lighted. The wire 96 is also connected from the right hand terminal of the "door lock release" timer 72 to one terminal of the door lock 52. It is evident that when the timer 72 operates, and the wire 95 is connected inside thereof to the wire 96, the wire 80 is effectively connected to one side of the electric door lock. The other terminal of the electric door lock 52 is connected directly to the wire 79 so that the door lock is effectively across the secondary of the control transformer and is thereby energized to release the lock on the door so that it can be opened by hand. The action of the electric door lock 52 and of the "door released" jewel lights 53—53 takes place at the same time.

When the customer sees the lights 53—53 come on, he knows that the door is released and that he may open it. As he opens the door, the door limit switch 54 is moved so that the wire 91 is no longer in contact with the wire 93 but is brought in contact with a wire 101 which is connected to one end of a coil of the "door lock release" disabling relay 74. The other end of the coil of the relay 74 is connected to the wire 79. Thus a circuit is established along the wire 80, through the contacter of the carrier limit switch 55, through wire 91, the door limit switch 54, wire 101, the coil of the relay 74, and back to the wire 79. This causes the coil of the relay 74 to be energized and causes the contacter 94 to move to disconnect wire 93 from wire 95 and connect wire 93 to a wire 102 which is connected to the left hand terminal of the "carrier in" delay timer 75. Removal of wire 93 from connection with wire 95 causes the circuit through the coil of the "door lock release" relay 73 to be interrupted and cuts off the power to the electric door lock 52 and the jewel lights 53—53. As this happens, a contacter 103 of the "door lock release" disabling relay 74 which is connected to the wire 91 is brought in contact with the wire 101 and "locks in" this relay 74.

The customer opens the carrier cover 29 by releasing the fastener 31. He signs the signature card therein, if necessary, places his deposit or check to be cashed in the article carrier, closes the cover 29 and closes the door 34. Closing of the door 34 causes the door limit switch 54 to move to remove the connection between the wires 91 and 101 and to remake the connection between the wire 91 and the wire 93. This sets up a circuit along the wire 80, through the carrier limit switch 55, the wire 91, the door limit switch 54, the wire 93, the contacter 94, and the wire 102 to the left hand terminal of the "carrier in" delay timer 75. The center terminal of this timer is connected to wire 79 so the timer goes into operation. After the timer has operated for the required period, the wire 102 is connected inside of the timer to the right hand terminal thereof which is in turn connected to a wire 104. This wire is connected to one end of the coil of the "carrier in" motor starter relay 68 and the other end of that coil is connected to the wire 69. This effectively connects the starter relay 68 across the control circuit transformer 78 and causes the relay 68 to operate to connect incoming power leads A, B and C to motor leads D, F and E respectively. At the same time, a contacter 105 of the relay 68 connects wire 104 to a wire 106 which extends to one terminal of the contacter of the "carrier in" motor disabling relay 77. The other end of this contacter is connected to the wire 80. This "locks in" the coil of the relay 68 until such time as the coil of the "carrier in" motor disabling relay 77 is energized. As soon as the motor 46 is connected to its power lines A, B and C, it operates to cause the blower 44 to move the article carrier from its position at the customer's unit to position in the teller's unit. Upon arrival there, the article carrier operates teller's unit carrier limit switch 63 to remove the connection between wire 80 and wire 98 and to again establish connection between wire 80 and wire 81. As explained previously, wire 81 is connected to the left hand terminal of the "carrier in arrival" timer 76 and the center terminal of the timer is connected to the wire 79. This causes the timer to begin its operation and when the required period has passed, wire 81 is again brought into connection with the wire 82 at a point inside of the timer 76. The wire 82 is connected to one end of the coil of the "carrier in" motor disabling relay 77 and the other end of that coil is connected to wire 79. This effectively connects the coil of the relay 77 across the secondary of the control circuit transformer 78 and causes the contact between wire 80 and wire 106 to be broken thus de-energizing "carrier in" motor starter relay 68 and causing the motor to be stopped. Wire 80 is brought in contact with wire 83 through the action of the "carrier in" motor disabling relay 77 and the circuit along wire 80, the relay 77, wire 83, through the "carrier in" lights 60—60 and back to the wire 79 causes these lights to again be lighted.

With the carrier in position at the teller's unit, the teller can open the hinged door 40 and the carrier cover 29 to remove the articles which the customer has placed in the article carrier. If the customer is making a withdrawal, the teller can put the money which is being withdrawn into the article carrier, close the carrier cover and the door 40 and send the carrier back to the customer's unit by again pressing the "carrier out" push button 57. This cycle of operation can then be repeated as many times as is necessary to complete the business at hand.

Should the teller wish to make it possible for the person at the customer's unit to open the door 34, he can do so by using his "emergency open" button 58. One side of the button 58 is connected directly to wire 80 and the other side thereof is connected to wire 96. Manual operation of the button 58, therefore, connects wire 80 with wire 96 and sets up a circuit from wire 96 through electric door lock 52 to the wire 79. The electric door lock is then directly across the secondary of the control transformer and is energized to release the door. In the event that the article carrier is in the teller's unit at the time the "emergency open" button is depressed, the door lock 52 will be "locked in" and the "door released" jewel lights 53—53 turned on in the manner described in connection with the operation of the "door lock release" timer 72. In the event that the article carrier is at some other position and the contacter of the limit switch 63 is not in contact with the wire 98, the electric door lock 52 will be released only as long as the "emergency open" push button 58 is depressed by the teller. The "door released" jewel lights will not come on if the article carrier is not in contact with the limit switch 63.

Should it become desirable for the teller to cause the article carrier 26 to move from the customer's unit to the teller's unit, the teller can accomplish this movement by depressing the "emergency in" button 59. This button serves the same function as does the "carrier in" delay timer 75 as far as starting the electric motor is concerned. The circuit through the wire 80, the customer's unit interlock switch 56, the wire 86, the teller's unit interlock switch 64, the wire 87, the "emergency in" push button 59 and the wire 104 connect to one side of the coil of the "carrier in" motor starter relay 68. The other side of this coil is connected to the wire 79. This causes the coil to be energized by being placed across the secondary of the control transformer when the "emergency in" push button 59 is depressed. As previously explained in connection with the timer 75, the contactor 105 of the motor starter relay 68 is connected on one side to the wire 64 and on the other side to the wire 106 which connects through the contactor of the "carrier in" motor disabling relay 77 to the wire 80. This causes the coil of the motor starter relay 68 to be energized even though the teller removed his hand from push button 59 and therefore locks the relay 68 into the circuit until such time as the "carrier in arrival" timer 76 causes the contact between the wire 80 and the wire 106 to be broken in the manner previously described. This takes place after a time delay following the arrival of the article carrier at the teller's unit.

As has been previously explained, interlock switches 56 and 64 prevent the carrier from moving when either of the doors 34 or 40 are open as they interrupt the circuit from the control transformer to the motor starter relays. This makes it impossible for the customer or teller to be injured by accidental movement of the carrier when their hands are inside of the case 33 or the case 39.

What is claimed is:

1. In combination, first and second substantially air tight cases provided with first and second doorways respectively, first and second doors for closing said doorways, a conveyor tube having first and second ends thereof open to the interior of said first and second cases, a power tube open to the interior of said first case, a reversible blower connected to said power tube, a reversible motor operably connected to said blower, a breather tube extending outwardly from said second case, an article carrier slidably situated in said conveyor tube and forming a substantially air tight seal with respect to the walls thereof, a signal circuit manually operable from adjacent the second case and including a signal device at said first case, a first power circuit for operating said electric motor to cause said blower to force air into said power tube, a second power circuit for operating said electric motor to cause said blower to evacuate air from said power tube, a first manually operable control circuit for establishing said first power circuit, a first limit switch situated to be operated by the arrival of said article carrier at said second case to disable said first control circuit to cause said first power circuit to be disconnected, an electric door lock on said second case to control said second door, a second control circuit operated by said first limit switch for actuating said electric door lock to release said second door, a second limit switch situated to be actuated by the closing and opening of the second door, a third control circuit actuated by said second limit switch for establishing said second power circuit responsive to the opening and closing of said door, a third limit switch situated to be operated by the arrival of said article carrier at said first case to disable said third control circuit to disconnect said second power circuit.

2. The combination as specified in claim 1 and first and second interlock switches situated to be open when said first and second doors are open and closed when said first and second doors are closed respectively and each operative to interrupt both said first and third control circuits when said interlock switch is open.

3. The combination as specified in claim 1, a first signal light connected to said second control circuit to be lighted when said second control circuit is energized, and a fourth control circuit including a second signal light operative in response to actuation of said third limit switch to cause said second signal light to be lighted when said article carrier is at the first case and to be disconnected when said article carrier is not at the first case.

4. In combination, a first substantially air tight enclosed case having a first air tight door thereon for permitting access to the interior thereof, a second case having a second door thereon for permitting access to the interior thereof, a conveyor tube having first and second ends thereof open to the interior of said first and second cases, a power tube open to the interior of said first case, a reversible blower connected to said power tube, a reversible motor operably connected to said blower, an article carrier slidably situated in said conveyor tube and forming a substantially air tight seal with respect to the walls thereof, a signal circuit manually operable from adjacent the second case and controlling a signal device in said first case, a first power circuit for operating said electric motor to cause said blower to force air into said power tube, a second power circuit for operating said electric motor to cause said blower to evacuate air from said power tube, a first control circuit including a first motor starter relay for establishing and maintaining said first power circuit, a first limit switch situated to be operated by the arrival of the article carrier at said second case, a second control circuit including a first timer and a first disabling relay for disabling said first control circuit in response to the actuation of said first limit switch, an electric door lock on said second case to normally maintain said second door in locked condition, a third control circuit including a second timer for energizing said electric door lock to release said second door responsive to the actuation of said first limit switch by the arrival of said article carrier at said second case, a second limit switch situated to be actuated by the closing and opening of said second door, a fourth control circuit actuated by said second limit switch when said second door is opened to disable said third control circuit, a fifth control circuit actuated by said second limit switch upon closing of said second door and including a second motor starter relay and a third timer for establishing and maintaining said second power circuit, a third limit switch situated to be operated by arrival of said article carrier at said first case, a sixth control circuit including a fourth timer and a second disabling relay for disabling said fifth control circuit responsive to actuation of said third limit switch upon arrival of said article carrier at said first case.

5. In combination, first and second substantially air tight cases provided with first and second doorways, respectively, first and second doors for closing said doorways, a conveyor tube having first and second ends thereof open to the interior of said first and second cases, a power tube open to the interior of said first case, a reversible blower connected to said power tube, a reversible motor operably connected to said blower, a breather tube extending outwardly from said second case, an article carrier slidably situated in said conveyor tube and forming a substantially air tight seal with respect to the walls thereof, a first power circuit for operating said motor to cause said blower to force air into said power tube, a second power circuit for operating said motor to cause said blower to evacuate air from said power tube, a first manually operable control circuit for establishing said first power circuit, a first limit switch situated to be operated by the arrival of said article carrier at said second case to disable said first control circuit to cause said first power circuit to be disconnected, a second limit switch situated to be actuated by the closing and opening of the second door, a second control circuit actuated by said second limit switch for establishing said second power circuit responsive to the opening and closing of said second door, a third limit switch situated to be operated by the arrival of said article carrier at said first case to disable said second control circuit to disconnect said second power circuit.

References Cited in the file of this patent

UNITED STATES PATENTS

| | | |
|---|---|---|
| 322,178 | Goodwin | July 14, 1885 |
| 543,184 | Jones | July 23, 1895 |
| 637,245 | Gremmels et al. | Nov. 21, 1899 |
| 1,057,266 | Pearsall | Mar. 25, 1913 |
| 1,134,402 | Needham | Apr. 6, 1915 |
| 1,429,461 | Shadinger et al. | Sept. 19, 1922 |
| 1,963,779 | Cutting | June 19, 1934 |
| 1,971,142 | Jennings | Aug. 21, 1934 |
| 2,003,257 | Fageol et al. | May 28, 1935 |
| 2,137,750 | Busch | Nov. 22, 1938 |